US007180206B2

(12) United States Patent
Haugs et al.

(10) Patent No.: US 7,180,206 B2
(45) Date of Patent: Feb. 20, 2007

(54) SYSTEM FOR VOLTAGE STABILIZATION OF POWER SUPPLY LINES

(75) Inventors: Espen Haugs, Sperrebotn (NO); Frank Strand, Moss (NO); Reidar Tjeldhorn, Oslo (NO)

(73) Assignee: Magtech AS (NO)

( * ) Notice: Subject to any disclaimer, the term of this patent is extended or adjusted under 35 U.S.C. 154(b) by 433 days.

(21) Appl. No.: 10/734,646

(22) Filed: Dec. 12, 2003

(65) Prior Publication Data

US 2004/0184212 A1 Sep. 23, 2004

Related U.S. Application Data

(60) Provisional application No. 60/433,601, filed on Dec. 16, 2002.

(30) Foreign Application Priority Data

Dec. 12, 2002 (NO) ................................ 20025990

(51) Int. Cl.
*H02J 3/24* (2006.01)
*H02J 3/00* (2006.01)

(52) U.S. Cl. ...................................................... 307/102

(58) Field of Classification Search ................. 307/102
See application file for complete search history.

(56) References Cited

U.S. PATENT DOCUMENTS 2,284,406 A 5/1942 D'Entremont .............. 175/358
2,333,015 A 10/1943 Kramer et al. .............. 171/242
2,716,736 A 8/1955 Rex ........................... 336/155
2,825,869 A 3/1958 Eckert, Jr. et al. ............ 323/89
2,883,604 A 4/1959 Mortimer ...................... 321/68
3,409,822 A 11/1968 Wanlass ....................... 323/22
3,612,988 A 10/1971 Wanlass ................ 323/43.5 R
3,757,201 A 9/1973 Cornwell .................. 323/44 R
3,936,727 A 2/1976 Kelley et al.
4,002,999 A 1/1977 Hesler et al. ............ 331/113 A
4,004,251 A 1/1977 Hesler et al. ............ 331/113 A
4,020,440 A 4/1977 Moerman ................... 336/155
4,028,614 A 6/1977 Kelley
4,163,189 A 7/1979 Smutney ........................ 323/6
4,202,031 A 5/1980 Hesler et al. ................. 363/97
4,210,859 A 7/1980 Meretsky et al. ......... 323/44 R
4,288,737 A * 9/1981 McClain et al. ............ 323/254
4,308,495 A 12/1981 Yasumura ................... 323/250
4,347,449 A 8/1982 Beau ........................... 310/42
4,393,157 A * 7/1983 Roberge et al. ............. 323/355
5,404,101 A 4/1995 Logue ................... 324/207.17

(Continued)

FOREIGN PATENT DOCUMENTS

DE 100 62 091 C1 7/2002

(Continued)

*Primary Examiner*—Burton S. Mullins
*Assistant Examiner*—Adi Amrany
(74) *Attorney, Agent, or Firm*—Kirkpatrick & Lockhart Preston Gates Ellis LLP

(57) ABSTRACT

The invention relates to a voltage stabilization system for power supply lines, comprising a variable inductance, an autotransformer and a system for controlling the variable inductance to automatically compensating for voltage variations of the power supply lines. The system can include a control system that includes a processor unit, a setpoint adjustment unit, a feedback unit and a rectifier circuit.

20 Claims, 17 Drawing Sheets

U.S. PATENT DOCUMENTS 5,672,967 A 9/1997 Jensen et al. ............... 324/253
5,895,979 A 4/1999 Kojovic
5,936,503 A 8/1999 Holmgren et al. ............ 366/90
6,232,865 B1 5/2001 Zinders et al. .............. 336/212
6,307,468 B1 10/2001 Ward, Jr. .................... 340/505
6,429,765 B1 8/2002 Valdemarsson et al. ..... 336/212
6,573,691 B2 6/2003 Ma et al.

FOREIGN PATENT DOCUMENTS

WO WO 94/11891 5/1994
WO WO 97/34210 9/1997
WO WO 98/31024 7/1998

* cited by examiner

SYSTEM FOR VOLTAGE STABILIZATION OF POWER SUPPLY LINES

CROSS-REFERENCE TO RELATED APPLICATIONS

This application claims the benefit under 35 U.S.C. § 119(e) of U.S. Provisional Application No. 60/433,601, filed Dec. 16, 2002, and claims priority to Norwegian Patent Application No. 2002 5990 filed on Dec. 12, 2002. The entire contents of these two applications are incorporated herein by reference.

FIELD OF THE INVENTION

The present invention relates generally to voltage stabilization. More particularly, the invention relates to methods and systems that employ a variable inductance to compensate for voltage variations that may arise in power supply lines.

BACKGROUND OF THE INVENTION

Undersized lines for electric power transmission, also referred to as "weak lines", have too small a conductor cross section in relation to the load requirements and a relatively high resistance. Excessive voltage drop will result from the losses caused by undersized conductors. The excessive voltage drop results in inadequate voltage levels for the electric power connected to the lines.

A transformer is a static unit which supplies a fixed voltage determined by the number of windings on the primary and secondary sides, i.e., the transformer ratio. A fixed transformer ratio may result in a voltage that is too low, (i.e., an undervoltage) when the load is high, and a voltage that is too high, (i.e., an overvoltage condition) when the load is low. Because the load is dependent at all times on the highly variable requirements of individual electric power consumers, fixed ratio transformers are often inadequate to serve a dynamic load.

The low voltage level can be compensated for by increasing the voltage in steps at the transformer that is supplying the line. In one prior art approach, the voltage level is controlled by means of a load tap changer on the transformer which is connected to the individual phase at the location where the voltage reaches an unacceptably low level.

At present, the problem of weak lines is often solved by replacing existing lines with new lines having a larger cross section and correspondingly lower resistive losses. Presently, several methods are employed for upgrading the line. If there is room on the existing pole, a new line can be installed on the other side of the pole in parallel with the weak line. Once the new line is installed, the old one is disconnected and removed from service. This approach allows the power transmission system to be upgraded without a noticeable interruption in service. Another method involves installing hardware for securing new lines to the existing poles, disconnecting the weak lines, and quickly installing the new lines. This approach results in a longer interruption in service when compared with the preceding approach. In a third method, used mainly when the old route cannot be used, a new route is constructed. Such construction involves the installation of new poles and new conductors. Significantly, before construction begins, the new route may have to be approved by local government and property owners.

In another prior art approach to voltage regulation, a mechanically controlled variac (i.e., a transformer with variable transformer ratio) is used in connection with a transformer. However, mechanically controlled variacs, generally, are no longer used because the mechanical components required frequent service.

Another method that is currently employed consists of relocating the electric lines closer to users and connecting a new transformer to the relocated line where it will be closer to users. This approach is also undesirable because of the large scope of work required to relocate electric lines and the high cost associated with such a project.

U.S. Pat. No. 3,409,822 to Wanlass (hereinafter "Wanlass") describes a voltage regulator that includes a device with an AC or load winding and a DC or control winding wound on a ferromagnetic core. In a portion of the core, a DC generated flux component and an AC generated flux component are provided along the same path but with an opposite direction at all times. As a result in these portions, the flux components are subtracted and the core has a permeability that, to a limited extent, corresponds to the resulting flux. In other portions, but not the entire core, the fluxes are orthogonal to one another. For example, Wanlass shows a regulator based on flux control in the core's legs via addition or subtraction of magnetic fluxes lying in the same path (coincident fluxes with opposite signs). However, the power handling capability of the device is limited because the regulator described in Wanlass is meant for operation in the non-saturated area of the core, and the permeability range is limited to the linear region of the core.

SUMMARY OF THE INVENTION

The present invention addresses the problems related to prior solutions of the problem created by weak lines. In contrast to prior methods, the permeability control is performed using orthogonal fields and it is not performed by means of parallel fields which are added or subtracted.

In one aspect, the invention is a system for voltage stabilization of power lines including an autotransformer having a series winding and a parallel winding, a variable inductance connected to the autotransformer, and a control system. The variable inductance includes a magnetic core, a main winding wound around a first axis, and a control winding wound around a second axis orthogonal to the first axis. When the main winding and the control winding of the variable inductance are energized, orthogonal fluxes are generated in the magnetic core. This voltage stabilization system automatically compensates for voltage variations in the power supply line to which it is connected. In one embodiment, the orthogonal fluxes are generated in substantially all of the magnetic core. In another embodiment, the magnetic core is made from anisotropic magnetic material.

In one embodiment of the voltage stabilization system described above, the control system includes a processor unit which controls a control current supplied to the control winding, a setpoint adjustment unit in electrical communication with the processor unit, and a switch. The switch connects and disconnects the regulation and is in electrical communication with the processor unit. The system also includes a feedback input which senses an output voltage. The feedback input is in electrical communication with the processor unit and the power supply line. The control system also includes a rectifier circuit in electrical communication with both the processor unit and the control winding.

In one version of the above embodiment, the series winding of the autotransformer is connected in series with a first power supply line and the parallel winding is connected in series with both the main winding and a second power supply line.

In another version of the above embodiment, the series winding and the main winding are connected in series with a first power supply line, the main winding is located on a line side of the series winding, and the parallel winding is directly connected to a second power supply line.

In yet another version of the above embodiment, the series winding and the main winding are connected in series with a first power supply line, the main winding is located on the load side of the series winding, and the parallel winding is directly connected to a second power supply line.

In another aspect, the invention includes a method of stabilizing a voltage. An input voltage is supplied to an autotransformer and a controllable inductance is connected in series with at least one winding of the autotransformer. An output voltage is sensed. Orthogonal magnetic fields are generated in a magnetic core of the controllable inductance. At least one of the orthogonal magnetic fields is adjusted to control permeability of the magnetic core in order to adjust the voltage in response to the output voltage sensed.

In systems according to an embodiment of the invention there is practically no transformer action between the main winding and the control winding because the two fields are orthogonal in all parts of the core. Thus, the operation of the device can be extended into the saturable region of the core. This extended operation increases the power handling capacity of the variable inductance by one order of magnitude, because the power handling capacity is proportional to the inverse of the permeability of the material (when the permeability is halved, the power handling is doubled). Thus, the invention can be used in high power applications.

Further, a dynamic voltage booster or voltage stabilization system employing orthogonal flux control to increase a line voltage as required to avoid an undervoltage condition and to adjust the line voltage to maintain the voltage at a desired value is a very efficient alternative for improving weak lines. Such a unit can be connected to a weak line and dynamically compensate for a load-dependent voltage drop.

The system according to the invention includes an electronically controlled orthogonal flux inductance. Together with a transformer, this inductance provides a variable output voltage which compensates for undesirable drops in voltage.

A voltage stabilization system for power supply lines, in one embodiment, includes a control system for controlling the current in the control winding as a function of the desired and actual operating parameters of the line. In one version, the operating parameter is the line voltage. The regulating system supplies power to the control winding in the variable inductance based on line measurements and desired values of the line voltage (e.g., setpoints), with the result that the output voltage maintains the desired value.

Embodiments of the invention permit existing weak lines to be adapted to maintain adequate voltage in a simple and inexpensive manner when there is an increase in energy use. In one embodiment, adequate voltage is maintained by connecting the voltage stabilization system in the line between the distribution transformer and the users. In a version on the embodiment, the autotransformer adds a voltage in series with the supply voltage, thus enabling the line voltage to be stabilized. The variable inductance regulates the voltage across the inductance (by altering the permeability of the inductance core by means of orthogonal fields), or the time voltage integral across it, in order to regulate the voltage across the series winding in the autotransformer.

This voltage stabilization must be performed swiftly in order to avoid damage to equipment on the user side, because damage of this kind could occur if a rapid change of load leads to an excessive overvoltage. In the system according to an embodiment of the invention, changes in the voltage will be controlled by means of the current in the control winding. The low inertia and responsiveness of the system allows it to absorb voltage peaks and troughs.

BRIEF DESCRIPTION OF THE DRAWINGS

The foregoing and other objects, features and advantages of the present invention will be more fully understood from the following description when read together with the accompanying drawings.

DETAILED DESCRIPTION

Figure 1:
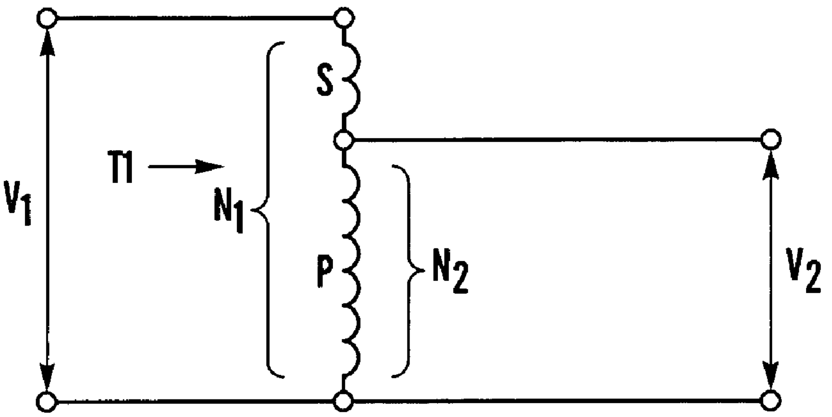
FIG. 1 illustrates an autotransformer.

An autotransformer is a transformer with a series winding S and a parallel winding P. FIG. 1 illustrates an autotransformer T1 where the parallel winding P and the series windings S are connected in series. The series winding S has a relatively small number of turns, while the parallel winding P has a relatively large number of turns. In one embodiment, the series winding has approximately 20 turns and the parallel winding has approximately 230 turns. An applied voltage V1 is divided in proportion to the number of turns in the series winding S and in the parallel winding P. If the total combined number of turns included in parallel winding P and series winding S is N1, and the number of turns in the parallel winding P is N2, a voltage V2 having a value of V1(N2/N1) will appear across the parallel winding P. This device is also reversible, so that if a voltage V2 is applied across the parallel winding P, a flux is established which links both the parallel winding P and the series winding S. As a result, a potential difference of V1=V2(N1/N2) appears across N1 turns.

Figure 2:
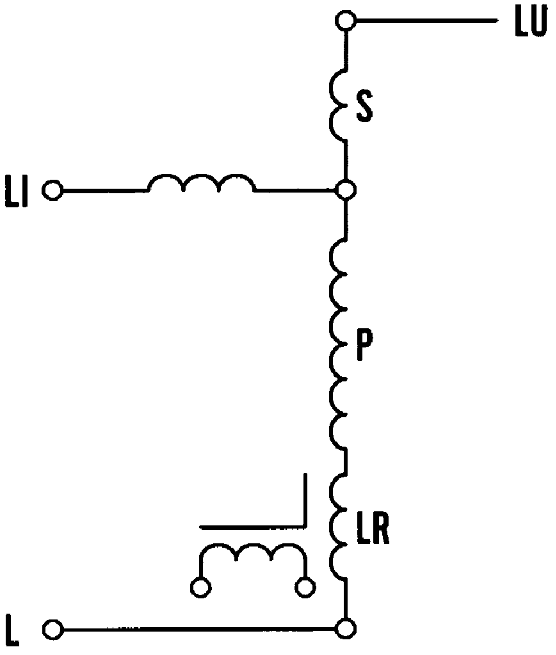
FIG. 2 illustrates a first embodiment of the invention.

In a first embodiment of the invention shown in FIG. 2, the series winding S is connected in series with a first power supply line (e.g., a first phase) from the line input LI to the line output LU. In this embodiment, the parallel winding is connected to a second power supply line (e.g., a second phase) L via an orthogonal field variable inductance LR. The voltage in the series winding S can be changed here by changing the voltage in the parallel winding P by means of the variable inductance LR.

Figure 3:
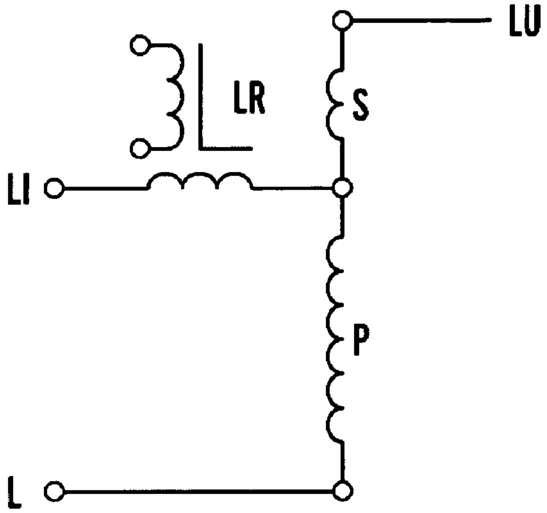
FIG. 3 illustrates a second embodiment of the invention.

In a second embodiment of the invention shown in FIG. 3, the variable inductance LR and the series winding S are connected in series with the first power supply line from LI to LU, with the variable inductance connected to the line side LI of the series winding S. The parallel winding P is connected to the second power supply line.

Figure 4:
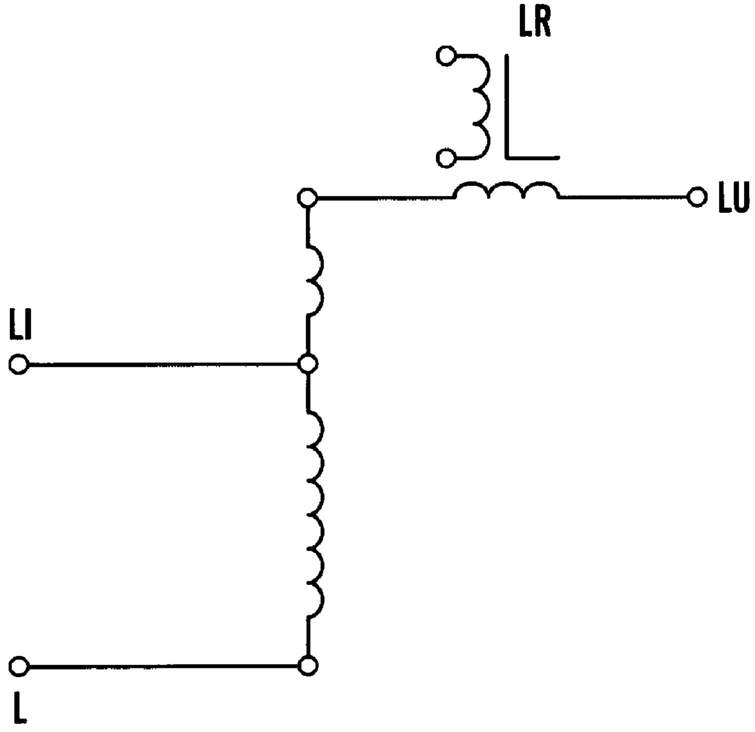
FIG. 4 illustrates a third embodiment of the invention.

In a third embodiment of the invention shown in FIG. 4, the variable inductance LR and the series winding S are connected in series with the power supply line from LI to LU, with the variable inductance connected to the load side LU of the series winding S. The parallel winding is connected directly to the second power supply line L. In versions of the preceding embodiments, the second phase is a neutral conductor.

In the second and the third embodiments of the invention, the voltage in the first power supply line LI–LU will be changed because the variable inductance LR absorbs a time voltage integral that remains in series with the voltage from the series winding S of the autotransformer.

Because the voltage absorbed by the variable inductance is a reactive voltage, the voltage leads the current by 90°. As a result, the voltage to be subtracted or added to the load voltage is 90° out of phase with a resistive current drawn by the load. In the autotransformer there is an ampere-turn balance between the series winding S and the parallel winding P. The current drawn by the load is therefore reflected in the parallel winding P and causes a voltage drop in the variable inductor. The magnitude of the voltage drop depends on the value of the variable inductance and the amount of current.

In one embodiment, a fixed inductor is mounted in parallel with the parallel winding of the autotransformer. This reduces the harmonics generated by the system and stabilizes control of the system. Alternatively, a variable inductance may be used.

In the second embodiment, the current through the variable inductance is the sum of the load current through the series winding and the current through the parallel winding, whereas in the third embodiment, the current through the variable inductance is the load current. In the first embodiment, the current through the variable inductance is the current in the parallel winding. Because these currents have different magnitudes, an embodiment can be selected based on the particular application.

Figure 5:
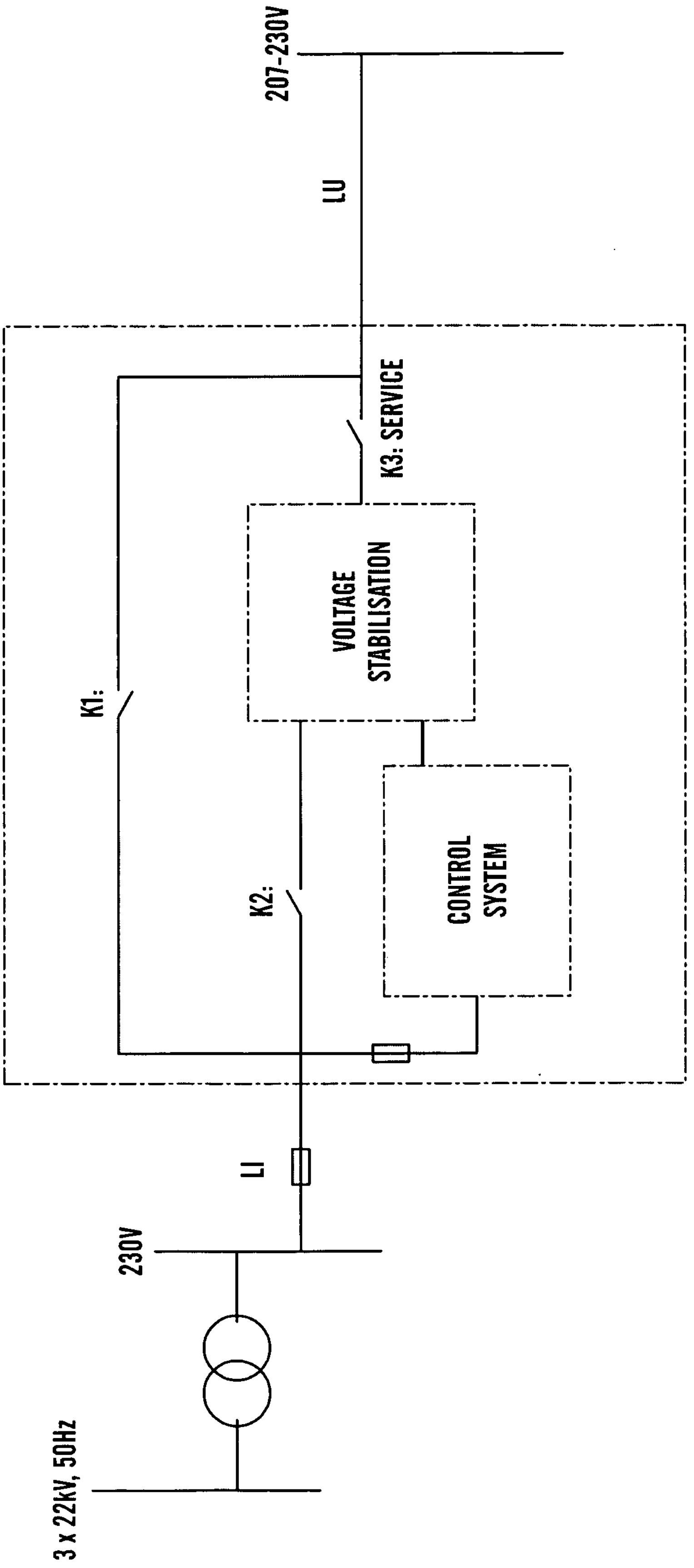
FIG. 5 illustrates a general block diagram of an embodiment according to the invention.

FIG. 5 is a block diagram illustrating both the voltage stabilizer and the associated control system (e.g., regulating system). The first power supply line LI passes through the voltage stabilizer which is controlled by the control system. K1, K2 and K3 are switches which allow the voltage stabilizer to be connected to, or disconnected from the network. In FIG. 5, K1 is illustrated in a closed state and K2 and K3 are shown as open, corresponding to the situation where the voltage stabilizer is not in use. When the voltage stabilizer is in use, K1 and K2 are opened and K3 is closed.

Figure 6:
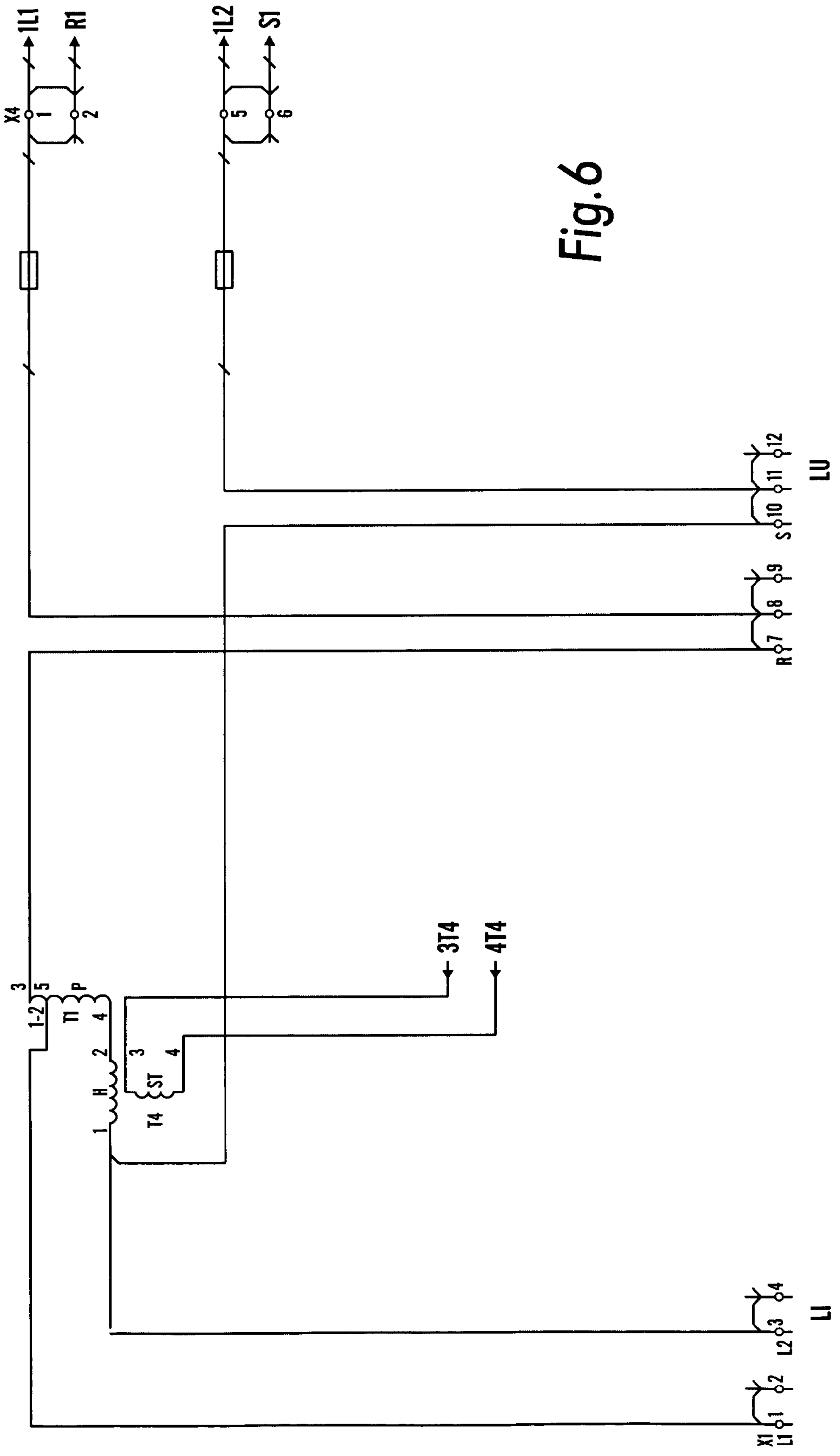
FIG. 6 illustrates the embodiment of FIG. 2 in greater detail.
Figure 7:
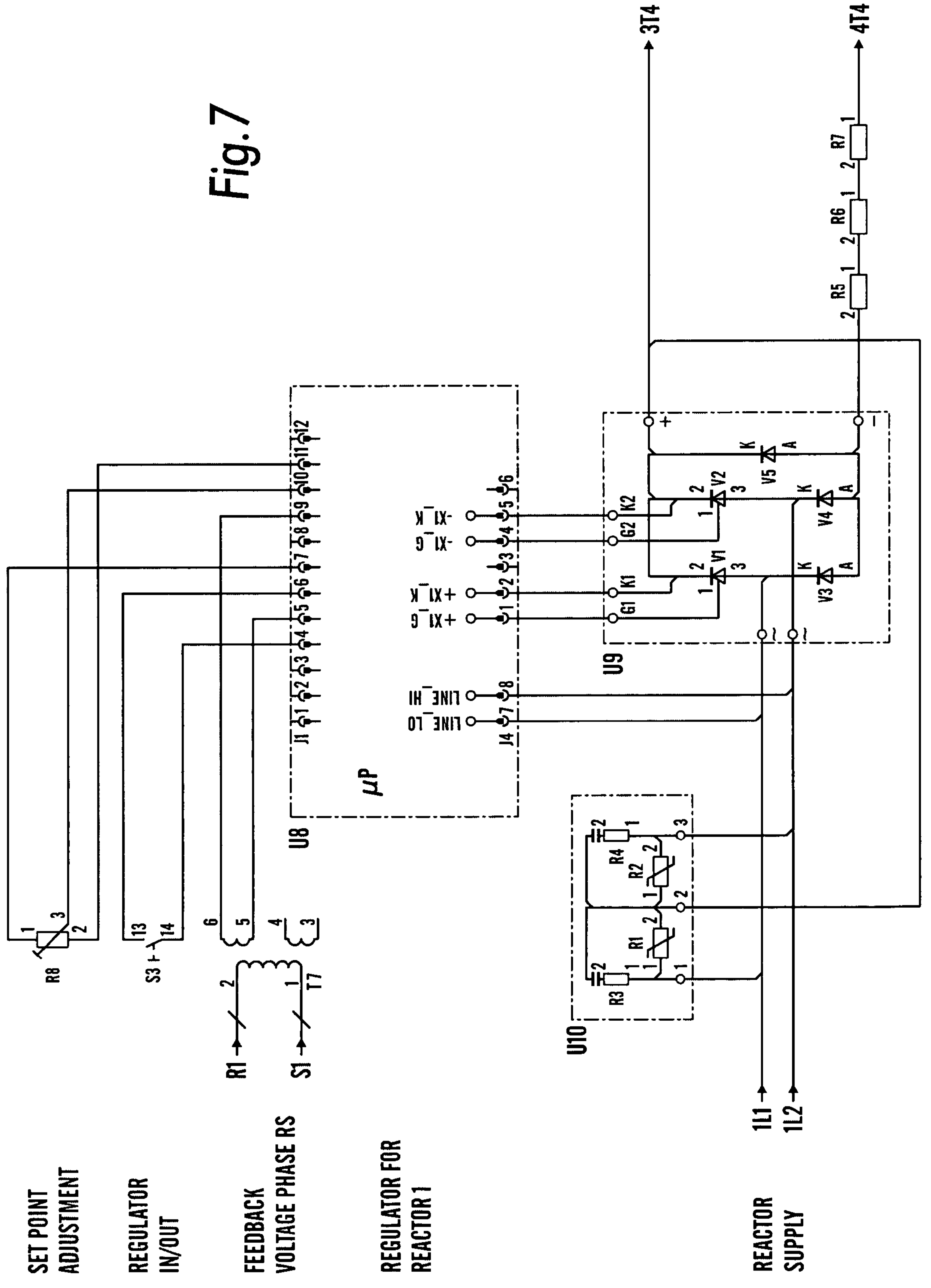
FIG. 7 illustrates a control system for controlling the embodiments shown in FIGS. 6 and 8.

FIGS. 6 and 7 illustrate a single-phase voltage stabilizer in more detail. T1 is the autotransformer with the series winding S located between terminals 1–2 and 3, and the parallel winding P located between terminals 1–2 and 4. This corresponds to the first embodiment of the invention illustrated schematically in FIG. 2.

In FIG. 6, T4 is the orthogonal field variable inductance LR with a working winding or main winding H located between terminals 1 and 2, and control winding ST located between terminals 3 and 4. The controllable inductance LR is connected to the parallel winding P of transformer T1 with terminal 2 of T4 connected to terminal 4 of T1. Terminals 1L1 and 1L2 supply voltage to a rectifier circuit U9 shown in FIG. 7.

FIG. 7 shows a control system for regulating current in the variable inductance T4. The control system includes a setpoint adjustment unit, a switch S3 for connecting or disconnecting the regulation, a feedback circuit for sensing the output voltage of the autotransformer T1, a processor unit U8, and a rectifier circuit U9 for connection to the control winding of the inductance. In one embodiment, the setpoint adjustment unit is a potentiometer R8 and the feedback circuit includes a transformer T7. In yet another embodiment, the processor unit U8 includes a microprocessor. In a further embodiment, the system also includes an overvoltage protection circuit U10.

In more detail, in one embodiment, the setpoint adjustment unit of FIG. 7 includes a first terminal, a second terminal, and a third terminal connected to terminals 7, 11 and 10 respectively of the processor unit U8. The switch S3 includes a first terminal and a second terminal connected to terminals 4 and 6 respectively of the processor unit U8. The primary terminals 1, 2 of transformer T7 are connected to S1 and R1 to sense the output voltage appearing at LU. In a version of this embodiment, a primary winding of transformer T7 is protected by fuses. A first terminal and a second terminal of a secondary winding of transformer T7 are connected to terminals 5 and 9 respectively of the processor unit U8.

In one embodiment, terminals 1L1 and 1L2, which correspond to R1 and S1, are connected to line inputs of the processor unit U8. In a version of this embodiment, an isolation transformer is used to reduce the voltage that appears at 1L1 and 1L2 before it is applied to the processor unit U8. The overvoltage protection unit U10 includes a first terminal, a second terminal, and a third terminal connected to 1L1, a rectifier positive output terminal, and 1L2 respectively. In a version of this embodiment, the overvoltage protection circuit includes a first potentiometer R1 connected between the first terminal and the second terminal, and a second potentiometer R2 connected between the second terminal and the third terminal. The over voltage protection circuit also includes fixed resistors R3 and R4.

In one embodiment, terminals 1L1 and 1L2 of FIG. 6 are also connected to a first terminal and a second terminal of the rectifier circuit U9. The rectifier circuit U9 output includes a positive terminal and a negative terminal that are connected to the control winding ST at terminals 3T4 and 4T4 respectively. In a version of this embodiment, a resistor network including one or more resistors (e.g., R5, R6 and R7) is connected in series between the negative terminal and the control winding ST.

In one embodiment, the rectifier circuit U9 is a full wave bridge circuit including four diodes V1, V2, V3 and V4. In a version of this embodiment, diodes V1 and V2 are controlled rectifier diodes, e.g., thyristors. The rectifier circuit U9 is connected to processor unit U8 via control terminals for diode V1 and control terminals for diode V2. In a further version of this embodiment, diode V5 is connected between the positive terminal and the negative terminal of the rectifier circuit U9.

In general, the control system of FIG. 7 automatically adjusts the voltage drop across the main winding H of the controllable inductor T4 by adjusting the power supplied to the control winding ST in response to changes to the output voltage of the autotransformer T1. A setpoint representative of the desired output voltage is established via the setpoint adjustment unit R8. A feedback circuit provides the processor unit U8 with an indication of the autotransformer T1 output voltage. The processor unit U8 compares the setpoint to the feedback voltage and adjusts the power supplied at the rectifier output terminals by controlling the operation of the rectifier circuit U9. In one embodiment, the output of the rectifier circuit U9 is a DC current.

This first embodiment of the invention, shown in FIG. 6, where inductance LR is series connected with the parallel winding P on the autotransformer T1, is implemented by a voltage across the parallel winding P in T1. This voltage is regulated by the inductance T4 which is connected in series by means of a transformer with the line voltage LI-LU between input terminal X1 and output terminal X1:7. As a result, the voltage supplied to the load from R and S on X1:7 and X1:10 can be increased. If the difference between the feedback signal and the setpoint is large, the regulator will increase the control current to the inductance T4, thereby increasing the additional voltage which compensates for the voltage drop. Conversely, if the additional voltage is too high, the power will be decreased by downwardly adjusting the voltage added to the line voltage. Thus, the output voltage supplied to the load is maintained at a level approximately equal to the setpoint voltage.

Figure 8:
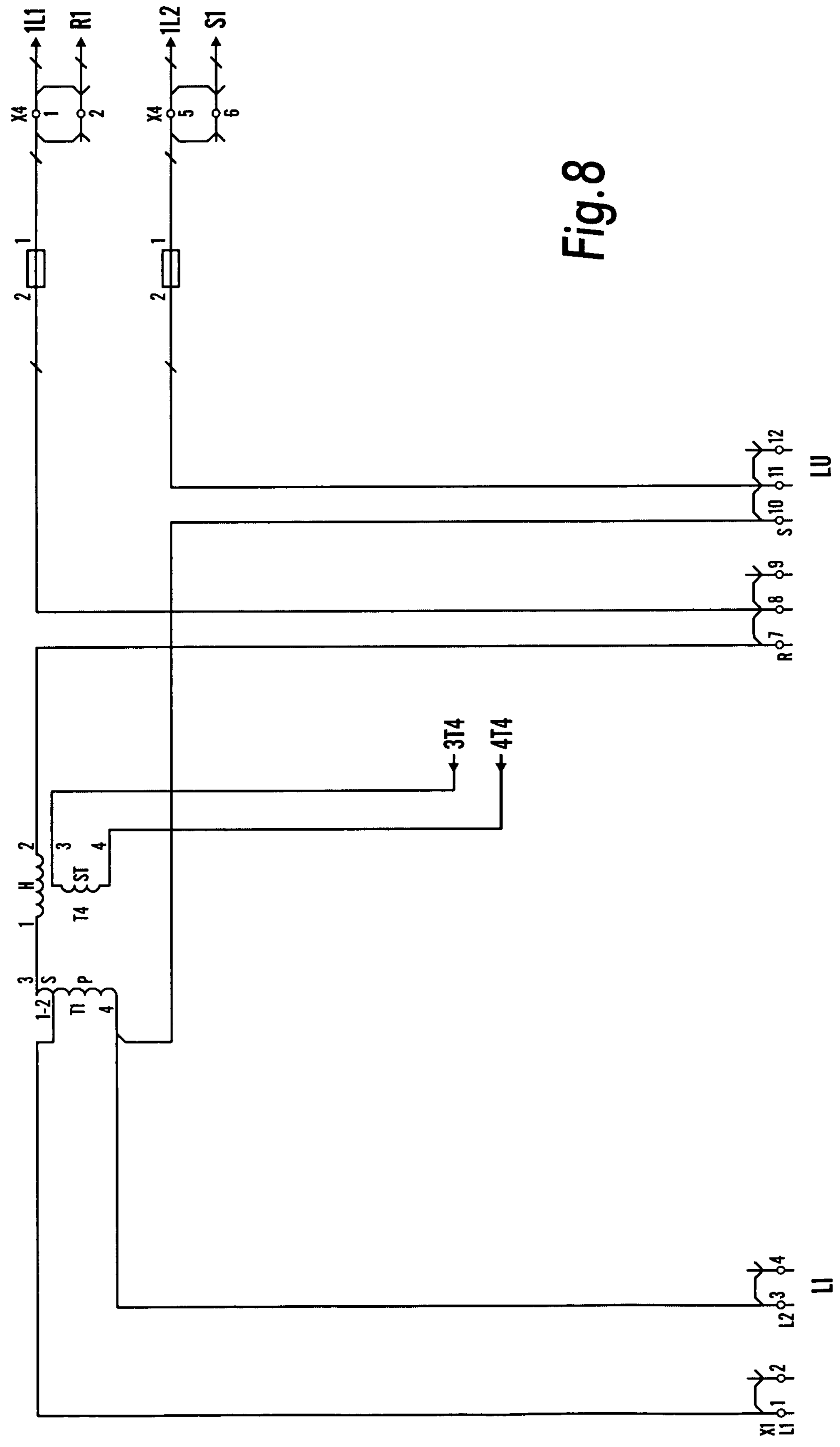
FIG. 8 illustrates the embodiment of FIG. 4 in greater detail.

FIG. 8 illustrates in more detail the third embodiment of the invention originally described broadly with reference to FIG. 4. In FIG. 8, T1 is an autotransformer with series winding S, located between terminals 1–2 and 3, and parallel winding P located between terminals 1–2 and 4. The control system related to this circuit is illustrated in FIG. 7.

T4 is the orthogonal field variable inductance with main winding H located between terminals 1 and 2, and control winding ST between terminals 3 and 4. Terminal 1 of inductance T4 is coupled to the output terminal of the series winding S at terminal T3. The control current is fed from the positive and negative terminals of a controlled rectifier circuit U9 in FIG. 7 to terminals 3 and 4 on the control winding ST of FIG. 8. The feedback of the output voltage from terminals R and S of the voltage stabilizer of FIG. 8 is connected to transformer T7 terminals 2 and 1 of FIG. 7. This connection provides a feedback signal to the rectifier regulator U8 of FIG. 7 In one embodiment, setpoint adjustments may be made via potentiometer R8. The voltage input to the rectifier U9 of FIG. 8 is supplied from terminal X1:2 and X1:4 of FIG. 7.

In this voltage system with inductance LR connected on the loadside of and in series with the output of series winding S of autotransformer T1, stabilization is implemented by regulating the stepped-up output voltage from T1 (outgoing line voltage) via a controllable inductive voltage drop across the inductance T4 which lies in series in the line.

If the difference between feedback signal and setpoint is large (e.g., a large undervoltage), the regulator will increase the control current to the inductance T4, thereby decreasing the voltage drop over the inductance to increase the voltage and compensate for the voltage drop. Conversely, if the additional voltage is too high (e.g., an overvoltage), the power supplied to the inductance T4 is decreased. As a result, the voltage drop across the inductance T4 increases, the voltage supplied to the load is decreased and the output voltage is maintained at the setpoint voltage.

Figure 9:
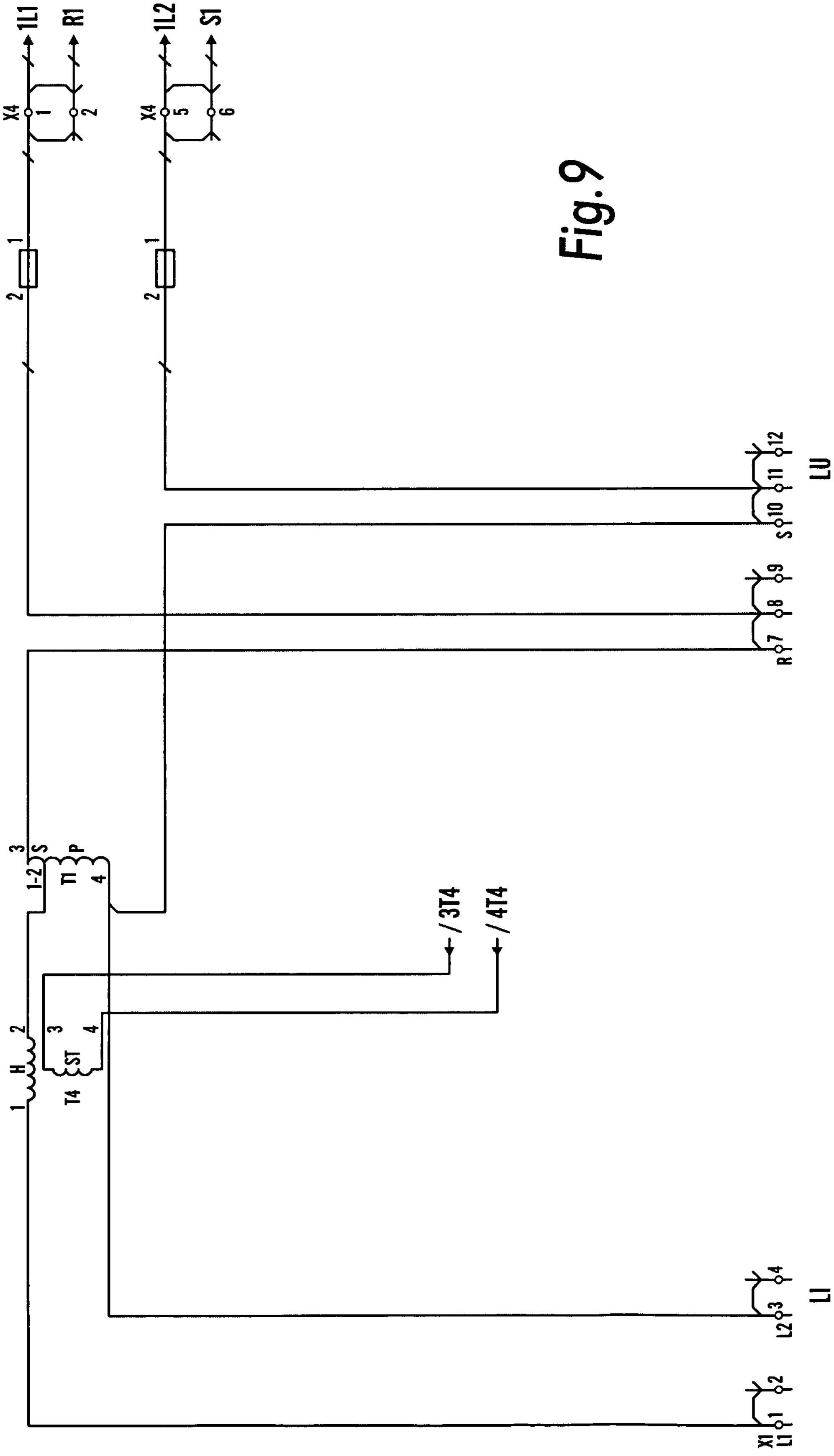
FIG. 9 illustrates the embodiment of FIG. 3 in greater detail.
Figure 10:
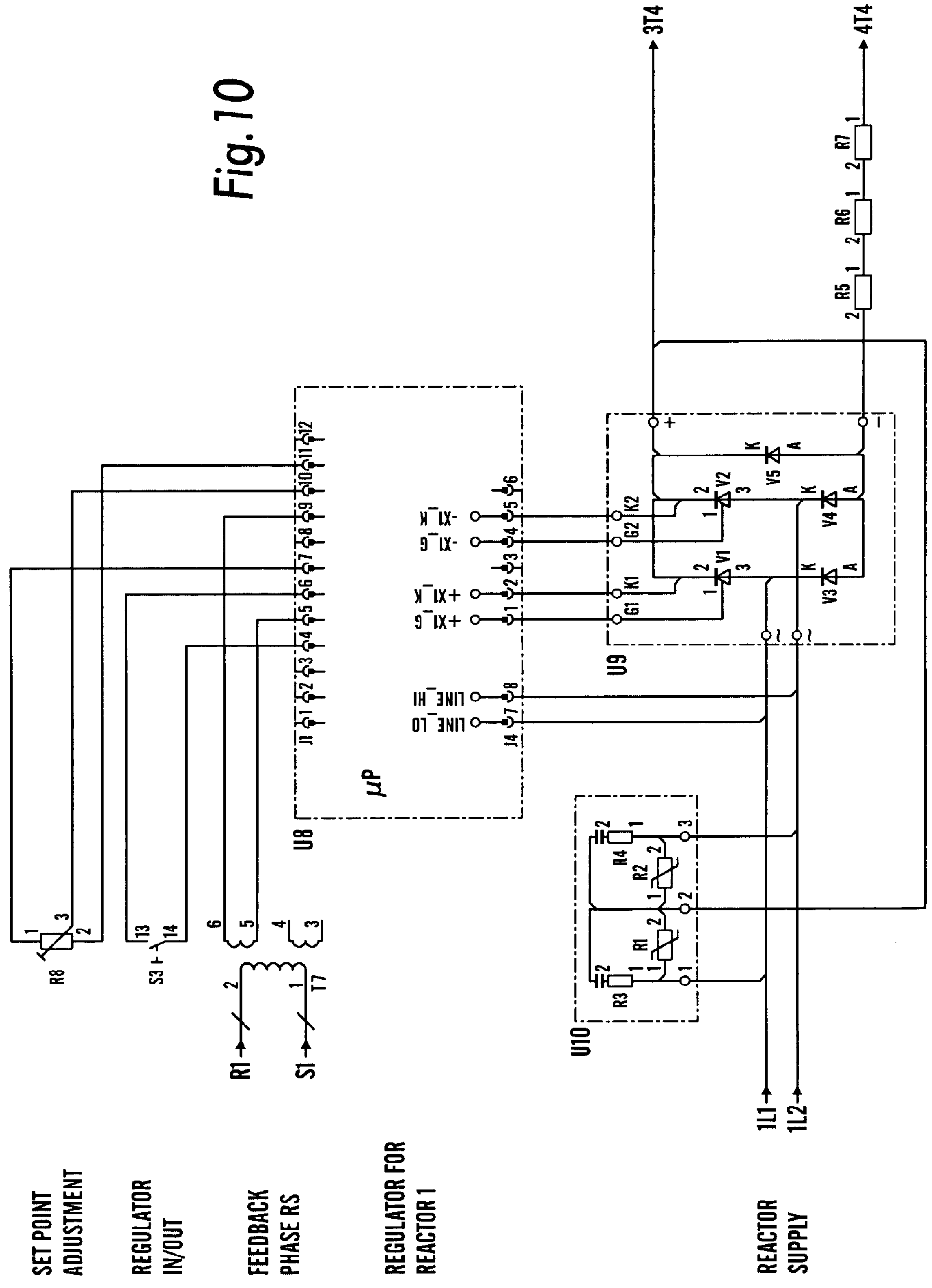
FIG. 10 illustrates a control system for control of the embodiment in FIG. 9.

FIG. 9 illustrates in more detail a second embodiment of the invention. Here, T1 is the autotransformer with series winding S located between terminals 1–2 and 3. The parallel winding P is located between terminals 1–2 and 4. This embodiment corresponds to the embodiment illustrated schematically in FIG. 3. The associated control system is shown in FIG. 10.

T4 is the variable inductance with main winding H located between terminals 1 and 2, and control winding ST located between terminals 3 and 4. Terminal T4:2 of the controllable inductance is connected to the series winding S at terminal T1:1–2. The parallel winding P is also connected to the terminal T1:2. FIG. 10, shows how the control current is fed from the positive and negative terminals of a controlled rectifier circuit U9 to terminals 3 and 4 on the control winding ST of FIG. 9. The feedback of the output voltage from terminal R and S of the voltage stabilizer is connected to transformer T7 terminals 2 and 1. This connection provides a feedback signal to the rectifier regulator U8. In one embodiment, setpoint adjustments may be made via potentiometer R8. The voltage input to the rectifier U9 is supplied from terminal X1:2 and X1:4 of FIG. 9.

This voltage regulator connection includes the inductance LR connected on the line side of and in series with the series winding S. In this embodiment, stabilization is implemented via regulation of the auto transformer input voltage via adjustment of the voltage drop across the inductance T4 which lies in series in the line.

If the value of the setpoint is much greater than the value of feedback signal (e.g. an undervoltage), the regulator will increase the control current to the inductance T4, to decrease the voltage drop across the inductance and compensate for the voltage drop. Conversely, if an overvoltage condition exists, the power supplied to the control winding is decreased in order to increase the voltage drop across the inductance and maintain the output voltage supplied to the load approximately equal to the setpoint voltage.

A three-phase embodiment for the single-phase solutions described thus far may be based on the same technical method of voltage regulation based on a comparison between the output voltage and a reference (e.g., a setpoint).

Figure 11:
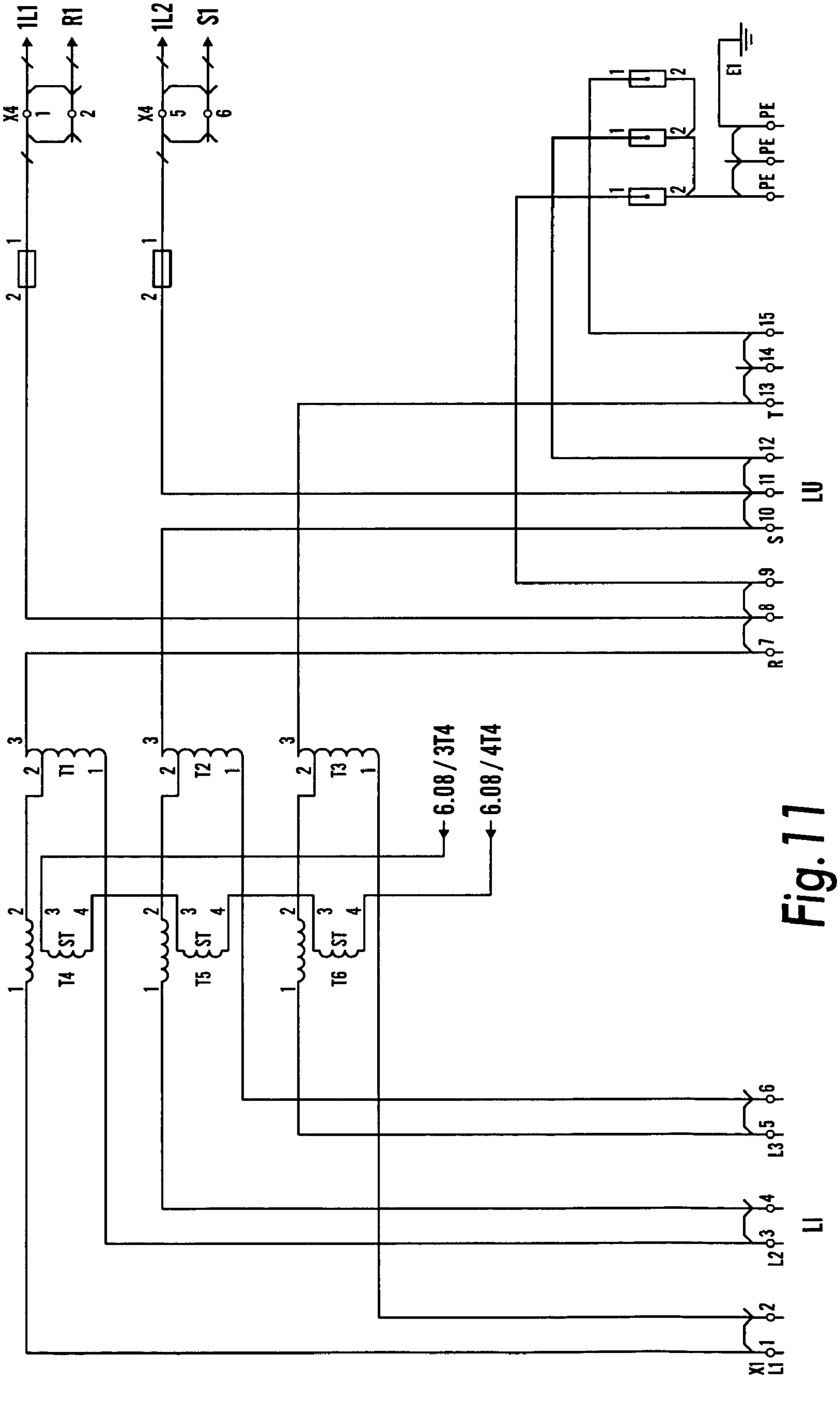
FIG. 11 illustrates a three-phase embodiment of the invention.
Figure 12:
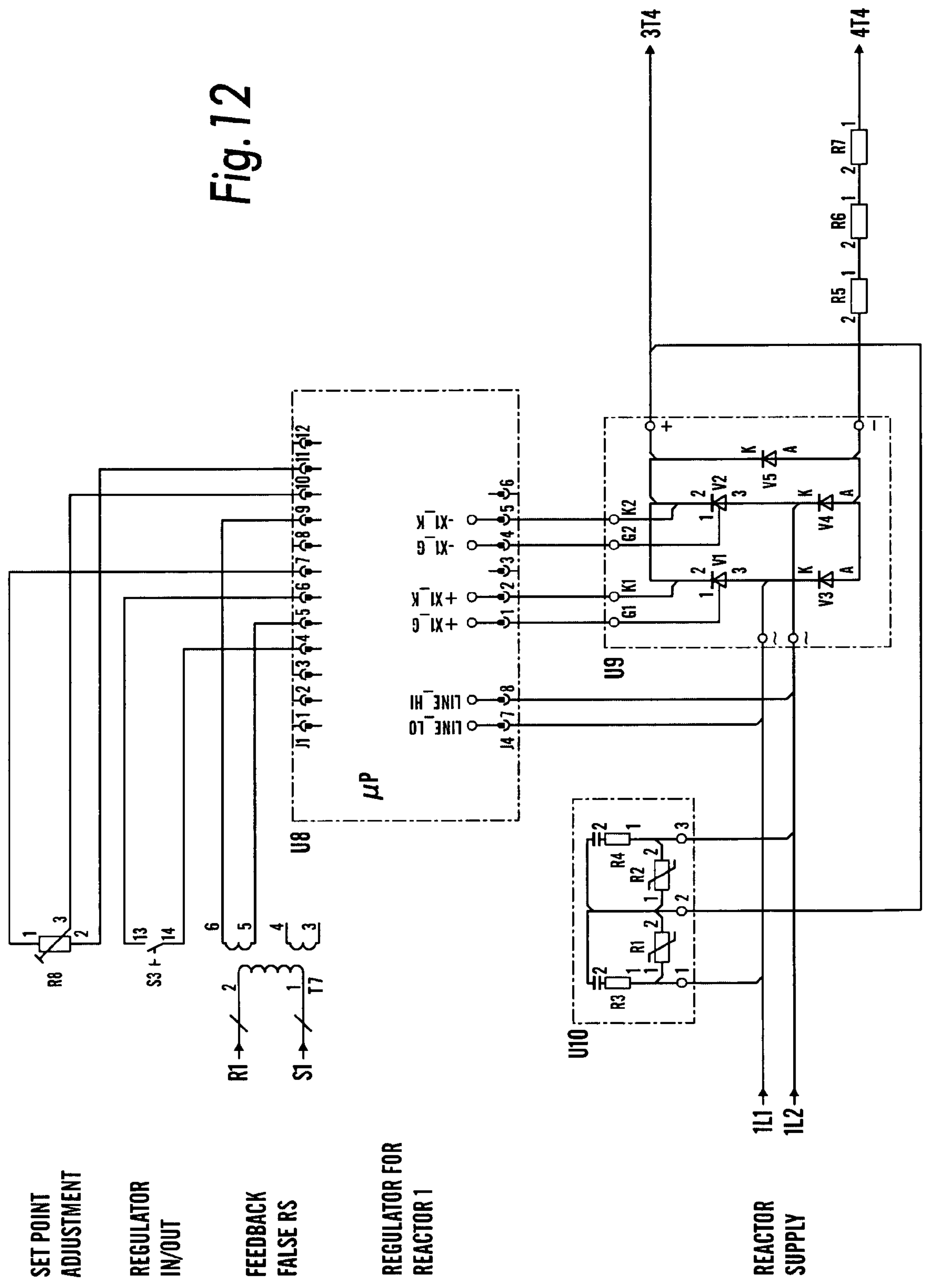
FIG. 12 illustrates a control system for control of the embodiment of FIG. 1.

FIGS. 11 and 12 illustrate a three-phase embodiment of the single-phase solution according to the second embodiment of the invention that is illustrated in FIG. 3. In FIG. 11 the control windings ST of inductances T4, T5 and T6 are shown connected in series and thereby are regulated equally via the control circuit of FIG. 12. FIG. 12 shows a regulation system corresponding to those described earlier. The regulation system includes a setpoint adjustment resistor R8, a switch S3 for connecting and disconnecting the regulator, a transformer T7 for feedback voltage from phase RS, a processor unit U8 (e.g., reactor regulator), a diode rectifier U9 and an overvoltage protection circuit U10. From the output of the regulation system (points 3T4 and 4T4), a current signal is sent to variable reactance T4. Separate regulation for each phase is also possible in a version of this embodiment.

Figure 13:
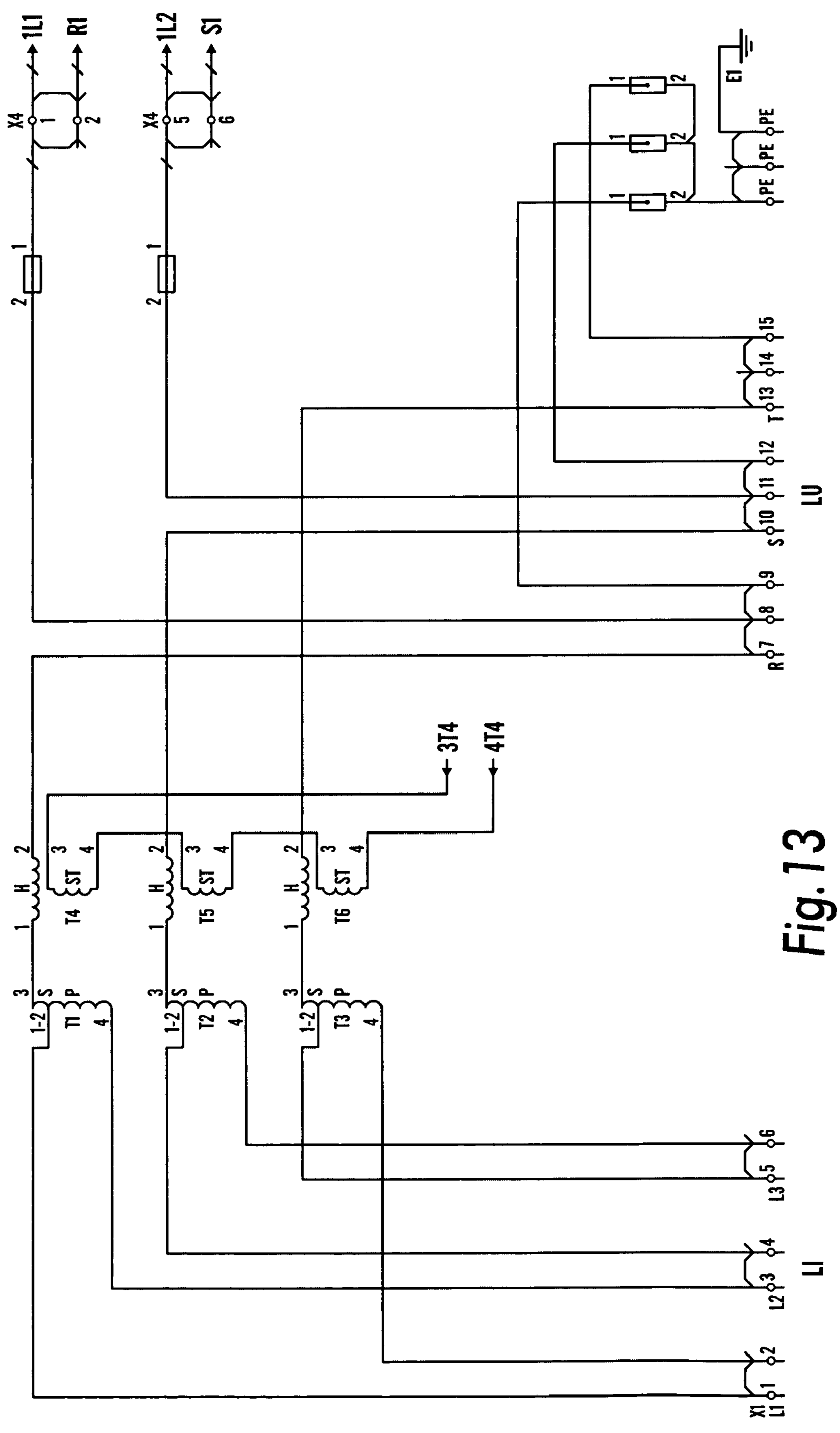
FIG. 13 illustrates a second three-phase embodiment of the invention.
Figure 14:
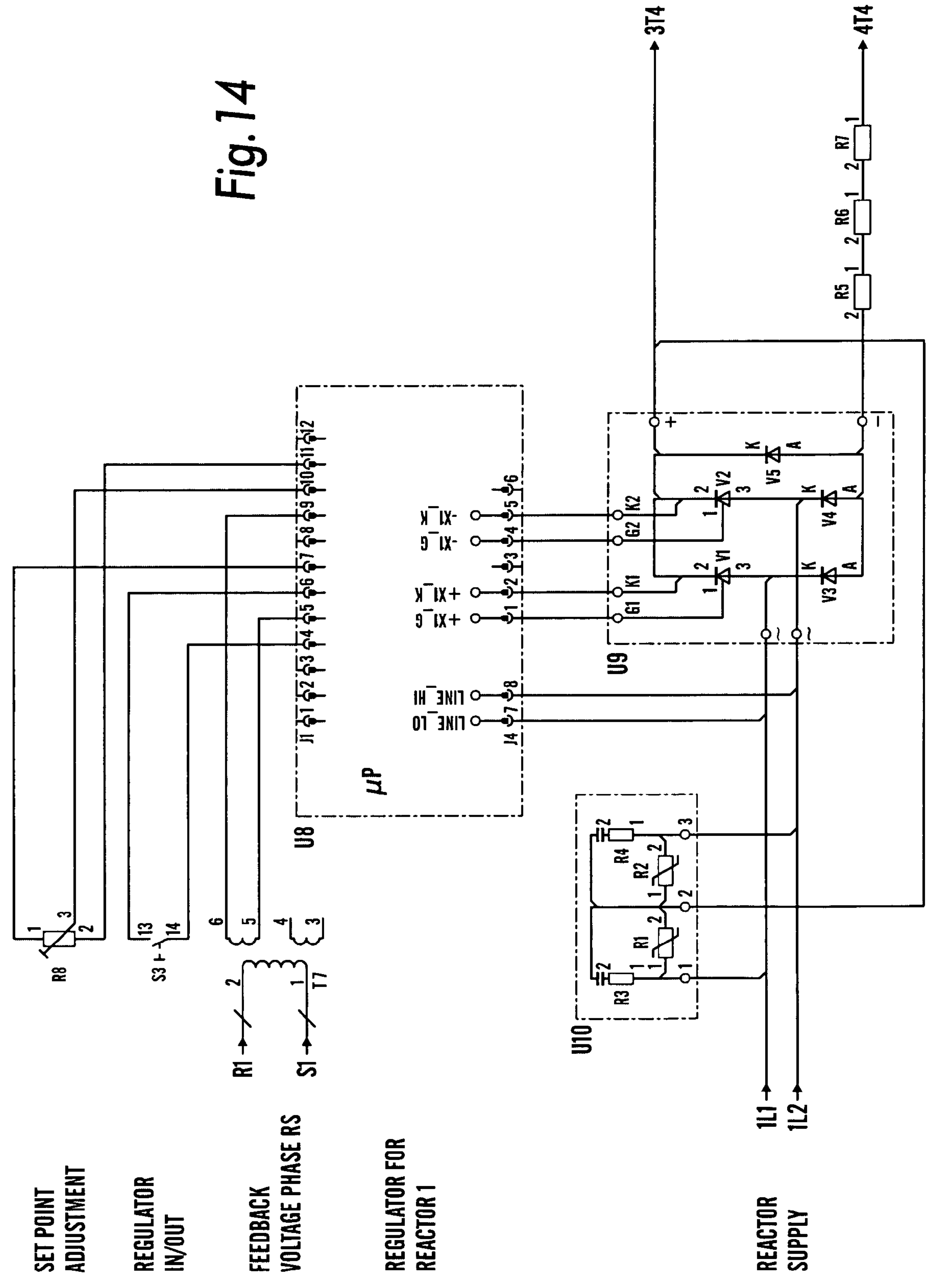
FIG. 14 illustrates a control system for control of the embodiment of FIG. 13.

FIGS. 13 and 14 illustrate a three-phase embodiment of the single-phase solution in FIG. 8, where the control windings of inductances T4, T5 and T6 (FIG. 13) are connected in series and thereby are regulated equally. Once again, separate regulation for each phase is also possible in a version of this embodiment. FIG. 14 shows the corresponding control circuitry employed for regulating the voltage supplied to the load.

Figure 15:
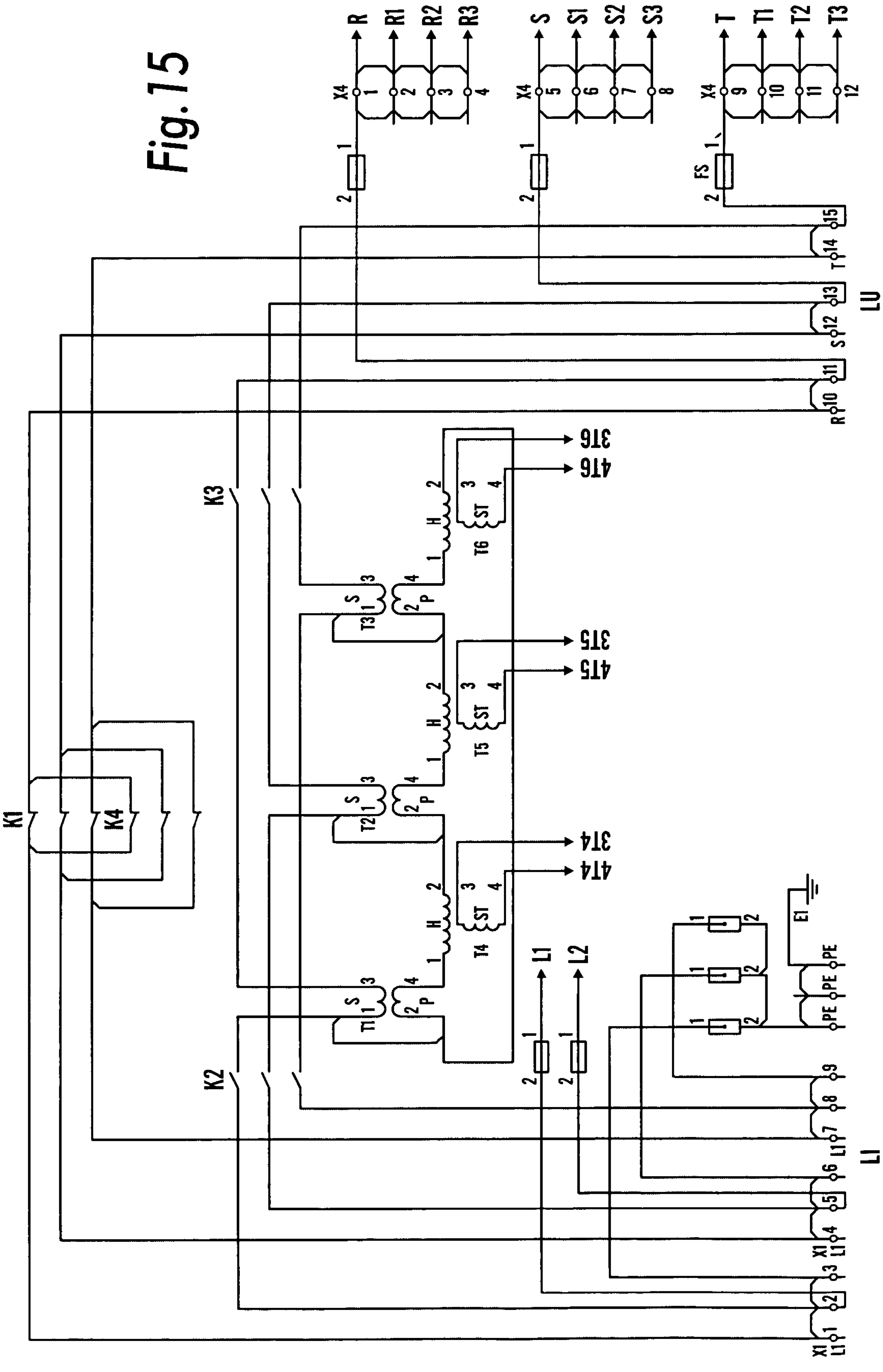
FIG. 15 illustrates a third three-phase embodiment of the invention.

FIGS. 15–18 illustrate a three-phase embodiment of the single-phase solution in FIG. 6. In FIG. 15, inductances T4, T5 and T6 are shown. Each of these inductances T4, T5 and T6 are regulated by separate regulating circuits. In this three-phase embodiment, the phase sequence is important since the voltages in the series windings S are added vectorially to the phase voltage from the feed transformers to the line (not shown). The series winding is placed between points 1 and 3 while the parallel winding is placed between points 2 and 4. The autotransformers for each phase T1, T2 and T3 are also shown in FIG. 15. The variable inductance T4 regulates the voltage to T1 in response to the feedback signal supplied from phase R-S (X1:7 and X1:10). Variable inductance T5 regulates the voltage to T2 in response to the feedback signal supplied from phase S-T (X1:12 and X1:14). Variable inductance T6 regulates the voltage to T3 in response to the feedback signal supplied from phase T-R (X1:14 and X1:10). In this manner, the line voltages for each phase can be regulated independently of one another.

Figure 16:
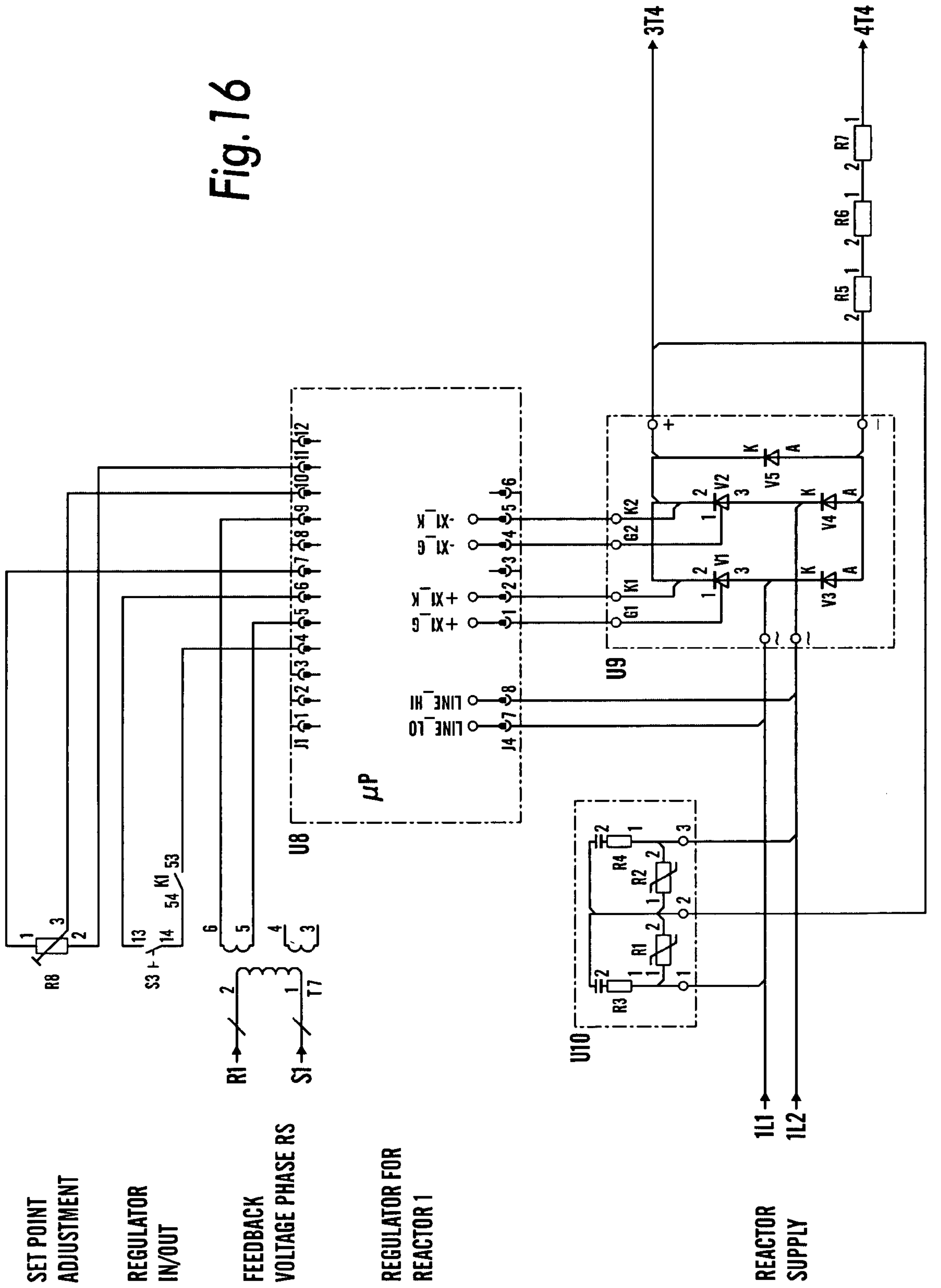
FIGS. 16–18 illustrate control systems for controlling the embodiment of FIG. 15.
Figure 17:
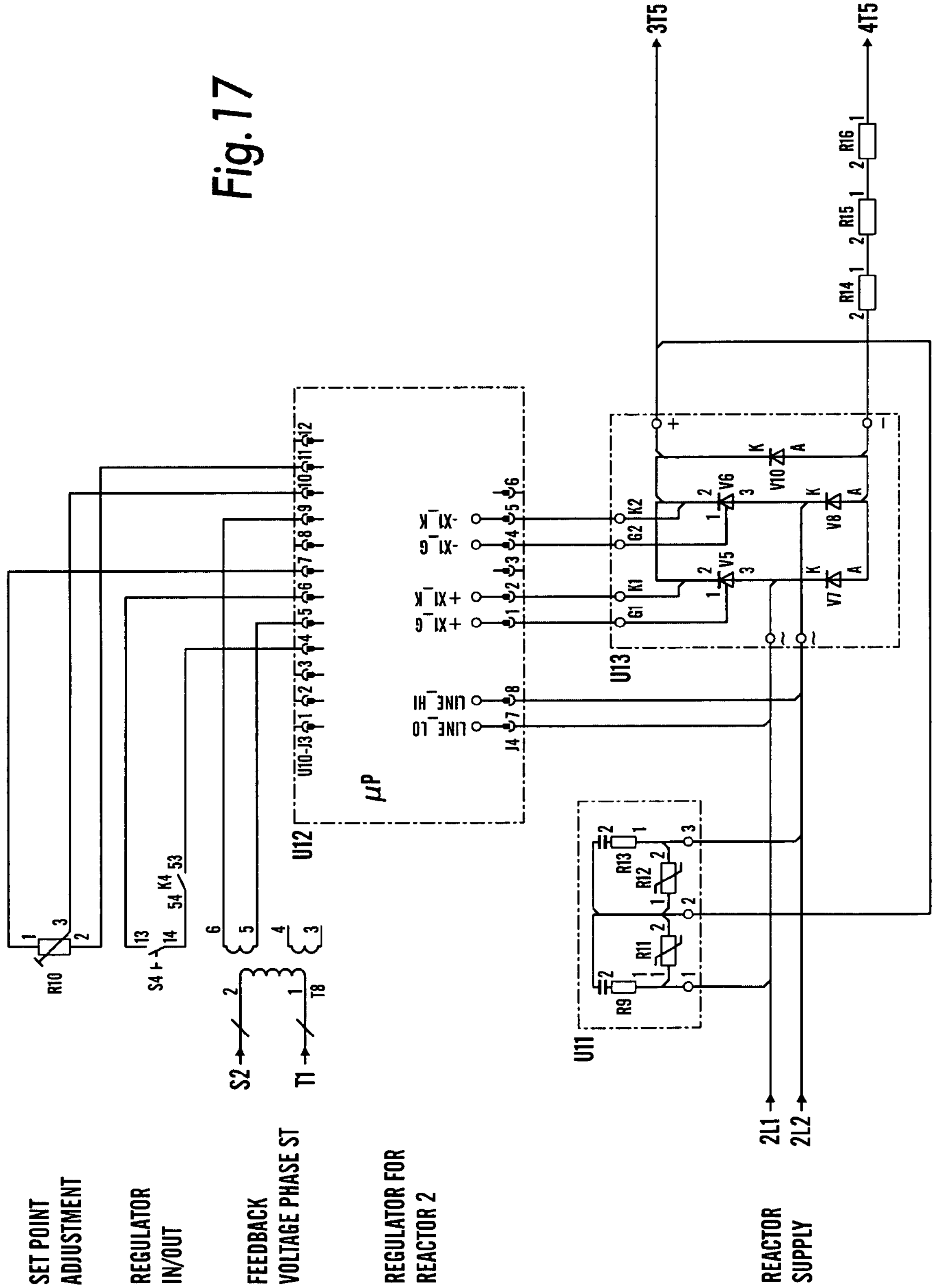
Figure 18:
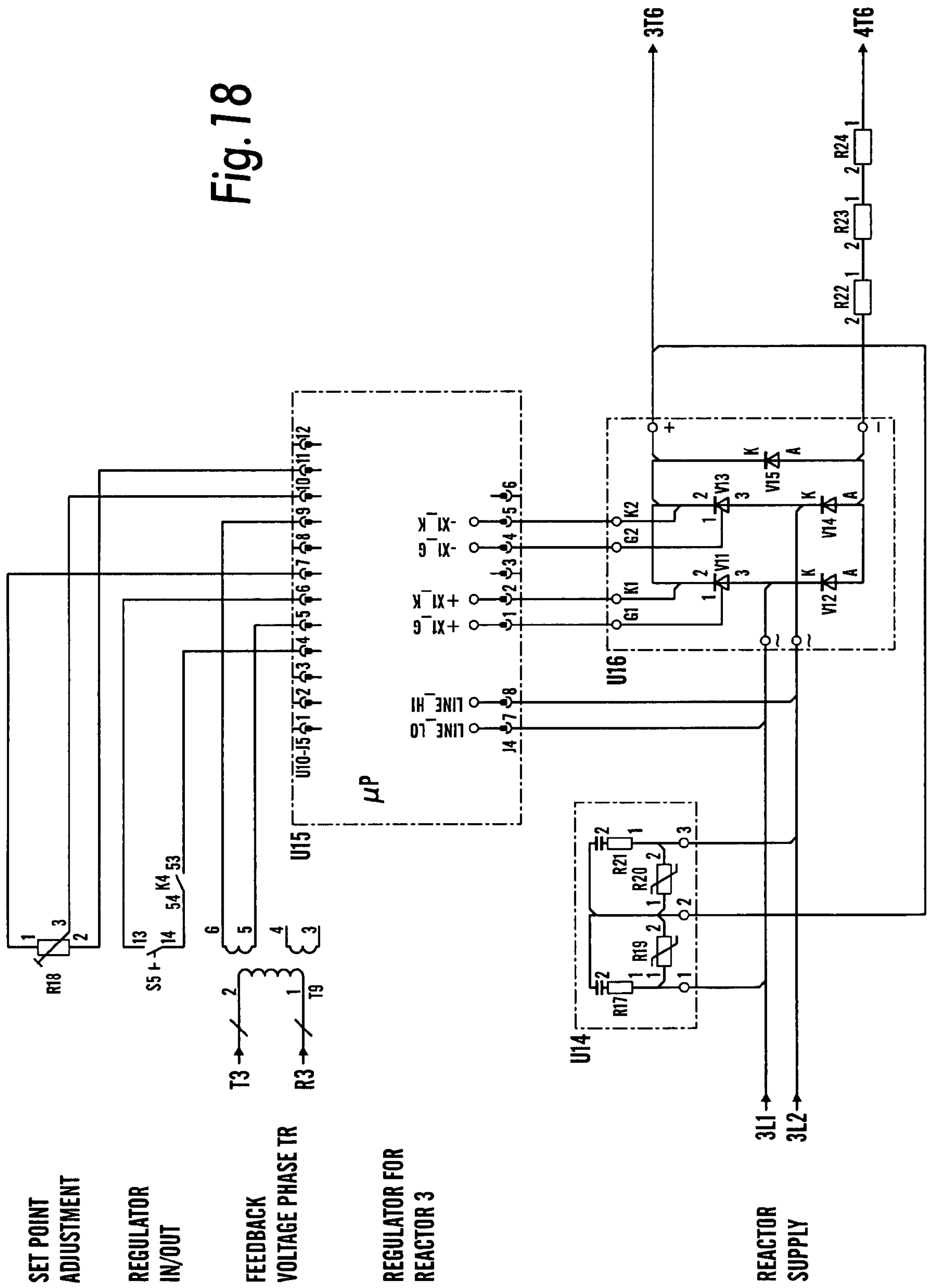

FIG. 16 illustrates regulation of the voltage in T1 by means of T4 in response to the desired voltage represented by the set point established by setpoint adjustment R8. The output signal (see bottom right in FIG. 16) is applied to the points 3 and 4 on T4. A corresponding regulation of T2 by means of T5 in response to setpoint adjustment R10 is illustrated in FIG. 17. Regulation of the voltage in T3 by means of T6 is illustrated in FIG. 18.

The three-phase system as described above shows a delta connection of the parallel winding. However, other connections may also be employed. For example, in one embodiment, the parallel windings are connected in a star (i.e., a wye) configuration which is well known connection topology for three-phase systems.

Figure 19:
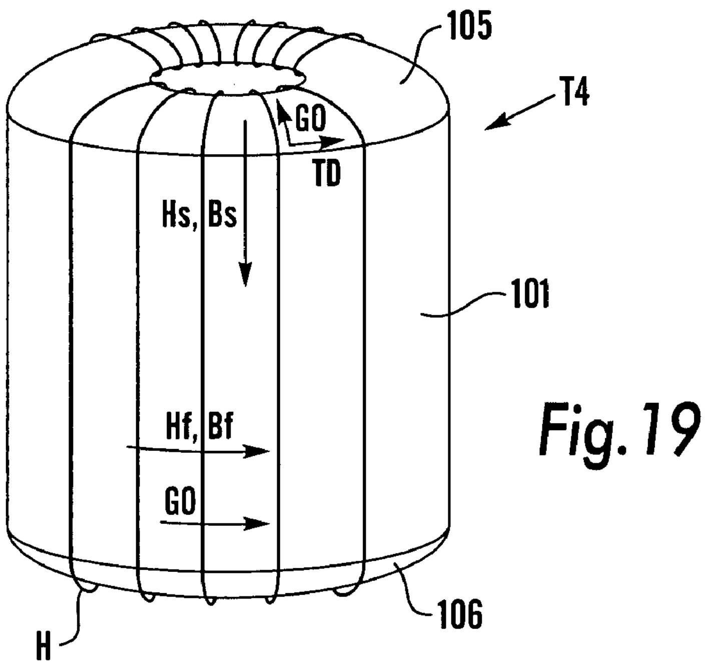
FIGS. 19 and 20 illustrate a controllable inductance according to an embodiment of the invention.

FIG. 19 shows an embodiment of the controllable inductor T4. The controllable inductor T4 includes a first pipe element 101, a main winding H wound around the first pipe element 101. The controllable inductor also includes magnetic end couplers 105, 106 in one embodiment. In one embodiment, the controllable inductor T4 is manufactured from anisotropic material. In a version of this embodiment, the anisotropic material is grain oriented anisotropic material. Where grain oriented material is used a grain oriented direction (GO) and a transverse direction (TD) can be defined.

Figure 20:
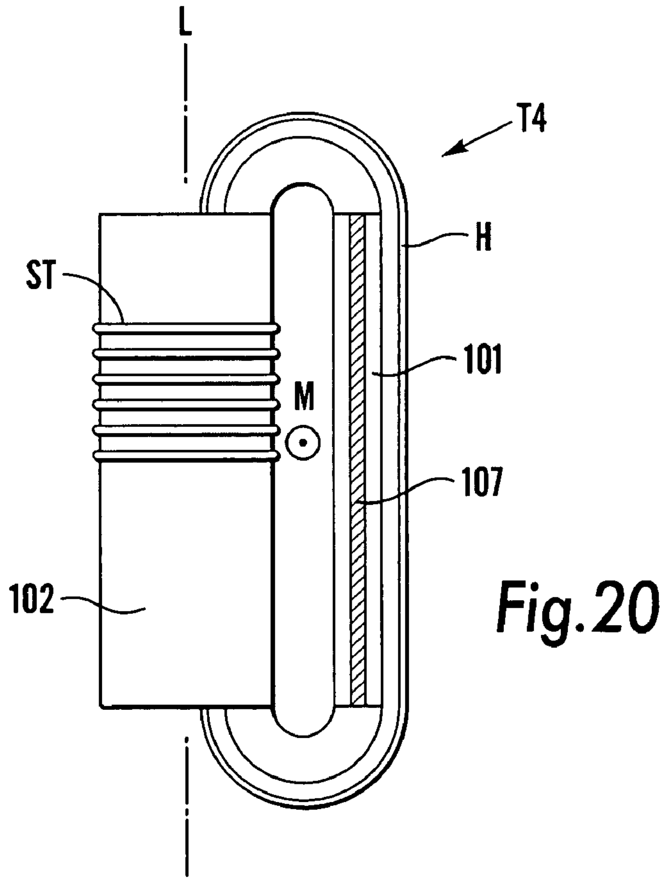

As shown in FIG. 20, the controllable inductor T4 also includes a second pipe element 102. A control winding ST is wound around the second pipe element and a second axis that is orthogonal to a first axis around which the main winding H is wound. In a version of this embodiment the second pipe element 102 is located concentrically within the first pipe element 101. End couplers 105 and 106 each connect an end of the first pipe element 101 to a corresponding end of the second pipe element 102. In a version of this embodiment, a magnetic core is formed by the first pipe element 101, the second pipe element 102, and end couplers 105, 106.

In the embodiment shown in FIG. 20, the first axis M is an annular axis relative to the second axis L. In this embodiment, second axis L is a linear axis located at the center of the second pipe member 102.

In operation, the controllable inductor T4 of FIGS. 19 and 20 develops two orthogonal fluxes. A first magnetic field $H_f$ and a first magnetic flux $B_f$ are generated when the main winding H is energized. A second magnetic field $H_s$ and a second magnetic flux $B_s$ are generated when the control winding ST is energized. In a version of this embodiment, the magnetic fields $H_f$, $H_s$ are orthogonal to one another in substantially all of the magnetic core, and the magnetic fluxes $B_f$, $B_s$ are orthogonal to one another in substantially all of the magnetic core.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A system for voltage stabilization of a power supply line, the system comprising:

an autotransformer comprising a series winding and a parallel winding;

a variable inductance connected to the autotransformer, the variable inductance comprising;

a magnetic core, a main winding wound around a first axis, and a control winding wound around a second axis; and a control system for controlling the permeability of the magnetic core, wherein voltage variations in the power supply line are automatically compensated for, wherein, when the main winding and the control winding are energized, orthogonal fluxes are generated in the magnetic core.

2. The system according to claim 1, the control system further comprising:

a processor unit;

a setpoint adjustment unit in electrical communication with the processor unit;

a switch in electrical communication with the processor unit;

a feedback input in electrical communication with both the processor unit and the power supply line; and a rectifier circuit in electrical communication with both the processor unit and the control winding, wherein the switch is operated to connect and disconnect regulation, wherein the feedback input senses and output voltage, and wherein the processor unit controls a control current supplied to the control winding.

3. The system according to claim 1, wherein the series winding of the autotransformer is connected in series with a first power supply line, and wherein the parallel winding is connected in series with both the main winding and a second power supply line.

4. A system according to claim 1, wherein the series winding and the main winding are connected in series with a first power supply line, wherein the main winding is located on a line side of the series winding, and wherein the parallel winding is directly connected to a second power supply line.

5. The system according to claim 1, wherein the series winding and the main winding are connected in series with a first power supply line, wherein the main winding is located on a load side of the series winding, and wherein the parallel winding is directly connected to a second power supply line.

6. A three-phase system for voltage stabilization, comprising a system according to claim 5 for voltage stabilization of each phase.

7. A three-phase system according to claim 6, wherein control windings for three phases are controlled in series and regulated together.

8. A three-phase system according to claim 6, wherein control windings for the three phases are controlled independently of one another.

9. The system according to claim 1 wherein the magnetic core comprises anisotropic material.

10. The system according to claim 1 wherein the orthogonal fluxes are generated in substantially all of the magnetic core.

11. A method of stabilizing a voltage, the method comprising the steps of:

supplying an input voltage to an autotransformer;

connecting a controllable inductance in series with at least one winding of the autotransformer;

sensing an output voltage;

generating orthogonal magnetic fields in a magnetic core of the controllable inductance; and adjusting at least one of the orthogonal magnetic fields to control a permeability of the magnetic core to adjust the voltage in response to the output voltage sensed.

12. The method of claim 11 wherein the controllable inductance is connected in series with a series winding in a circuit.

13. The method of claim 12 wherein the controllable inductance is connected to the load side of the series winding.

14. The method of claim 11 wherein the step of controlling a permeability further comprises, adjusting a control current supplied to a control winding of the controllable inductance.

15. A three-phase system for voltage stabilization, comprising a system according to claim 2 for voltage stabilization of each phase.

16. A three-phase system according to claim 15, wherein control windings for three phases are controlled in series and regulated together.

17. A three-phase system according to claim 15, wherein control windings for the three phases are controlled independently of one another.

18. A three-phase system for voltage stabilization, comprising a system according to claim 3 for voltage stabilization of each phase.

19. A three-phase system according to claim 18, wherein control windings for three phases are controlled in series and regulated together.

20. A three-phase system according to claim 18, wherein control windings for the three phases are controlled independently of one another.

* * * * *

UNITED STATES PATENT AND TRADEMARK OFFICE

CERTIFICATE OF CORRECTION

PATENT NO. : 7,180,206 B2

APPLICATION NO. : 10/734646

DATED : February 20, 2007

INVENTOR(S) : Haugs et al.

It is certified that error appears in the above-identified patent and that said Letters Patent is hereby corrected as shown below:

Title Page (56)

Page 2

Add the following foreign patent documents:

| | | |
|---|---|---|
| RU | SU 441601 | 06/1975 |
| RU | SU 877631 | 11/1981 |
| WO | WO 01/90835 | 11/2001 |
| WO | WO 02/027898 A1 | 04/2002 |
| WO | WO 04/040598 A1 | 05/2004 |
| WO | WO 03/034566 | 04/2003 |
| WO | WO 05/078546 | 08/2005 |
| GB | GB 1209253 | 10/1970 |

Signed and Sealed this

Fifth Day of June, 2007

JON W. DUDAS

*Director of the United States Patent and Trademark Office*